(12) United States Patent
Das et al.

(10) Patent No.: US 8,019,767 B2
(45) Date of Patent: Sep. 13, 2011

(54) CORRELATION-BASED VISUALIZATION OF SERVICE-ORIENTED ARCHITECTURE PROTOCOL (SOAP) MESSAGES

(75) Inventors: Andrew A. Das, Raleigh, NC (US); Charles Le Vay, Cary, NC (US); Chethan Ram, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 579 days.

(21) Appl. No.: 11/938,561

(22) Filed: Nov. 12, 2007

(65) Prior Publication Data

US 2009/0125524 A1    May 14, 2009

(51) Int. Cl.
*G06F 7/02* (2006.01)
(52) U.S. Cl. ........................................................ 707/741
(58) Field of Classification Search .................. 707/102, 707/999.102, E17.127, 741; 715/205, 234
See application file for complete search history.

(56) References Cited

U.S. PATENT DOCUMENTS

| | | | |
|---|---|---|---|
| 7,340,508 B1 * | 3/2008 | Kasi et al. | 709/219 |
| 7,392,257 B2 * | 6/2008 | Apparao et al. | 1/1 |
| 7,448,047 B2 * | 11/2008 | Poole et al. | 719/316 |
| 2002/0087596 A1 * | 7/2002 | Lewontin | 707/513 |
| 2003/0014553 A1 * | 1/2003 | Zhao | 709/313 |
| 2007/0106754 A1 * | 5/2007 | Moore | 709/217 |
| 2008/0209572 A1 * | 8/2008 | Kano et al. | 726/28 |

* cited by examiner

*Primary Examiner* — James Trujillo
*Assistant Examiner* — Soheila Davanlou
(74) *Attorney, Agent, or Firm* — Steven L. Nichols; Van Cott, Bagley, Cornwall & McCarthy P.C.

(57) ABSTRACT

Correlation-based visualization of markup language messages is implemented. According to an embodiment of the present invention, a message manager receives a markup language message exchanged over a network. Correlation logic applies a template to the markup language message. Correlation logic utilizes at least one rule to visually identify correlated message in the markup language message in a tree structure. The message manager outputs the tree structure.

18 Claims, 7 Drawing Sheets

```
<Envelope label> ~302a
    <Header label> ~304a
        header data ~308
    </Header label> ~304b
    <Body label> ~306a
        message data ~310
    </Body label> ~306b
</Envelope label> ~302b
```

CORRELATION-BASED VISUALIZATION OF SERVICE-ORIENTED ARCHITECTURE PROTOCOL (SOAP) MESSAGES

BACKGROUND OF THE INVENTION

The present invention relates in general to the field of data processing systems. More particularly, the present invention relates to field of communication between data processing systems.

SOAP enables data processing systems to exchange extensible markup language (XML) based messages utilizing hypertext transfer protocol (HTTP) or simple mail transfer protocol (SMTP). While there are many different types of messaging patterns in SOAP, the most common message pattern is the remote procedure call (RPC) pattern. In a RPC pattern, a first network node (e.g., a client) sends a request message to a second network node (e.g., a server), and the second network node sends a response message to the first network node.

BRIEF SUMMARY OF THE INVENTION

The present invention includes a system and method for implementing correlation-based visualization of markup language messages. According to an embodiment of the present invention, a message manager receives a markup language message exchanged over a network. Correlation logic applies a template to the markup language message. Correlation logic utilizes at least one rule to visually identify correlated message in the markup language message in a tree structure. The message manager outputs the tree structure.

BRIEF DESCRIPTION OF THE SEVERAL VIEWS OF THE DRAWINGS

FIG. 3 illustrates an exemplary markup language segment according to an embodiment of the present invention;

DETAILED DESCRIPTION OF THE INVENTION

Figure 1:
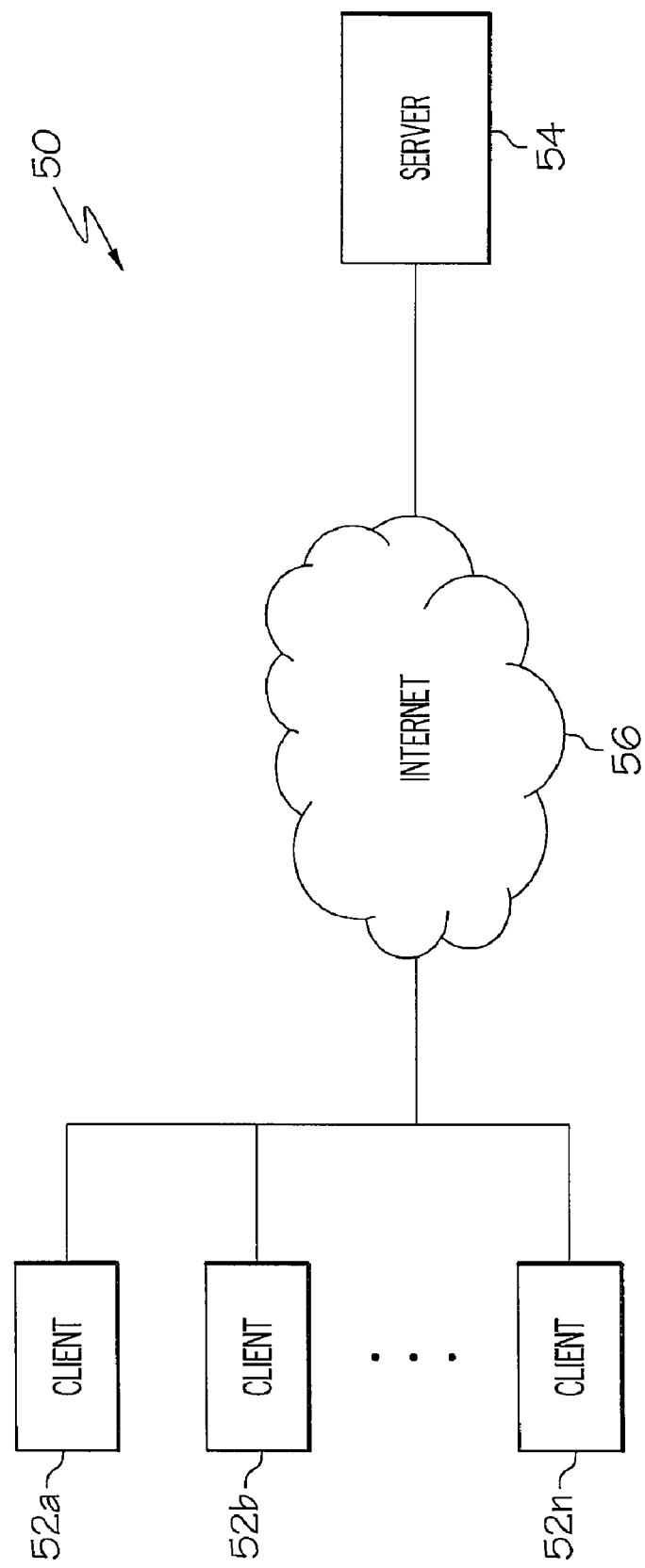
FIG. 1 is a block diagram illustrating an exemplary network according to an embodiment of the present invention.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system. Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning or the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber cable, RF, etc.

Computer program code for carrying out operations of the present invention may be written in an object oriented programming language such as Java® (Java is a trademark or registered trademark of Sun Microsystems, Inc. in the United States and other countries), Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, or as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrates and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implemented the function/act specified in the flowchart and/or block diagram block or blocks.

The computer program instructions may also be loaded onto a computer or other programmable data processing to cause a series of operational steps to be performed on the computer or other programmable apparatus to produce a computer-implemented process such that the instructions which execute on the computer or other programmable apparatus provide steps for implementing the functions/acts specified in the flowchart and/or block diagram or blocks.

Client-server interactions utilizing a web services model exchange extensible markup language (XML) messages utilizing the SOAP protocol. SOAP messages are normally exchanged utilizing the hypertext transfer protocol (HTTP). SOAP forms a foundation layer of the web services stack, which is a collection of computer networking protocols that enable different web services to interact with each other.

SOAP messages include a payload (in the SOAP body) and overhead content (in the SOAP header). SOAP headers include quality-of-service (QoS) information, which enable capabilities such as (but are not limited to) availability, reliability, accessibility, integrity, performance, security, and the like. SOAP monitoring tools, such as TCPIP monitor (WebSphere Application Server—WAS) and SOAP monitor (Emerging Technologies Toolkit—ETTK), provide a dump of the XML messages exchanged over the network. Since monitoring tools present the client SOAP request and the corresponding server SOAP response as raw XML messages to the user, there is no graphical support to depict relationship between a client's SOAP message and the corresponding service response message. It is left to the user of the monitoring tool to parse the entire client and server XML document to make any inferences about the validity of the client-server interaction. The present invention solves the lack of visualization of the client-server SOAP messages by providing a graphical technique to accentuate the individual XML elements in the SOAP overhead of the client request with the corresponding XML elements of the service response utilizing information in the SOAP header.

According to an embodiment of the present invention, the system and method visually correlates the SOAP QoS messages by: (1) identifying the QoS protocol elements present in the outbound SOAP request and inbound SOAP response for a transaction; (2) correlating a QoS protocol element in an outbound SOAP request with that of an inbound SOAP response; and (3) visually accenting the identified protocol element pairs in the client request and server response. For example, if the outbound request contained a <wsrm:Sequence> element, the <wsrm:SequenceAcknowledgement> in the response is visually accented.

Web service interactions can be complex to visualize. An embodiment of the present invention includes the simple cases of web services interactions where SOAP headers include single QoS elements (based on the specification of the QoS involved), and the more complex cases where multiple QoSes with asynchronous/synchronous message exchange patterns and stateful life cycle messages (e.g., life cycle messages that are state-dependent).

When life cycle messages are involved, QoS elements (e.g., WS-RM CreateSequenceRequest and CreateSequenceResponse) are implemented in the body of the SOAP message, in addition to the header. However, when security is configured, the body of the SOAP message is encrypted. The algorithm is flexible enough to utilize other tags in the header to identify life cycle messages.

An embodiment of the present invention involves using a pluggable correlation template and correlation logic, which applies the template to the SOAP message traces. Utilizing an artifact, such as a correlation-mapping file, the correlation logic can perform the visual correlation on any set of SOAP message traces. Each correlation-mapping file includes a XML formatted set of rules based on the web service specification-specific messages to be correlated. The correlation mapping file rule includes a unique identifier keyword, a corresponding correlated keyword, and a unique identifier keyword. Each of these keywords may be mandatory or optional. The correlation logic utilizes the mapping file to process the SOAP message trace to visually identify the correlated messages. Visual queues for correlated pairs would differ from keywords that are missing a correlated message. Also, optional correlated messages would be visually differentiated from mandatory messages.

Referring now to the figures, and in particular, referring to FIG. 1, there is illustrated an exemplary network 50 in which an embodiment of the present invention may be implemented. As depicted, exemplary network 50 includes: clients 52a-52n, server 54, and Internet 56. Server 54 may be implemented as any type of server or data processing system that provides some service to clients 52a-52n. While Internet 56 is utilized to couple clients 52a-52n and server 54, those with skill in the art will appreciate that local-area network (LAN), wide-area network (WAN) utilizing Ethernet, IEEE 802.11x, or any other communications protocol may be utilized. Those with skill in the art will appreciated that exemplary network 50 may include other components such as routers, firewalls, etc. that are not germane to the discussion of the exemplary network 50 and the present invention, and therefore will not be discussed further therein.

Figure 2:
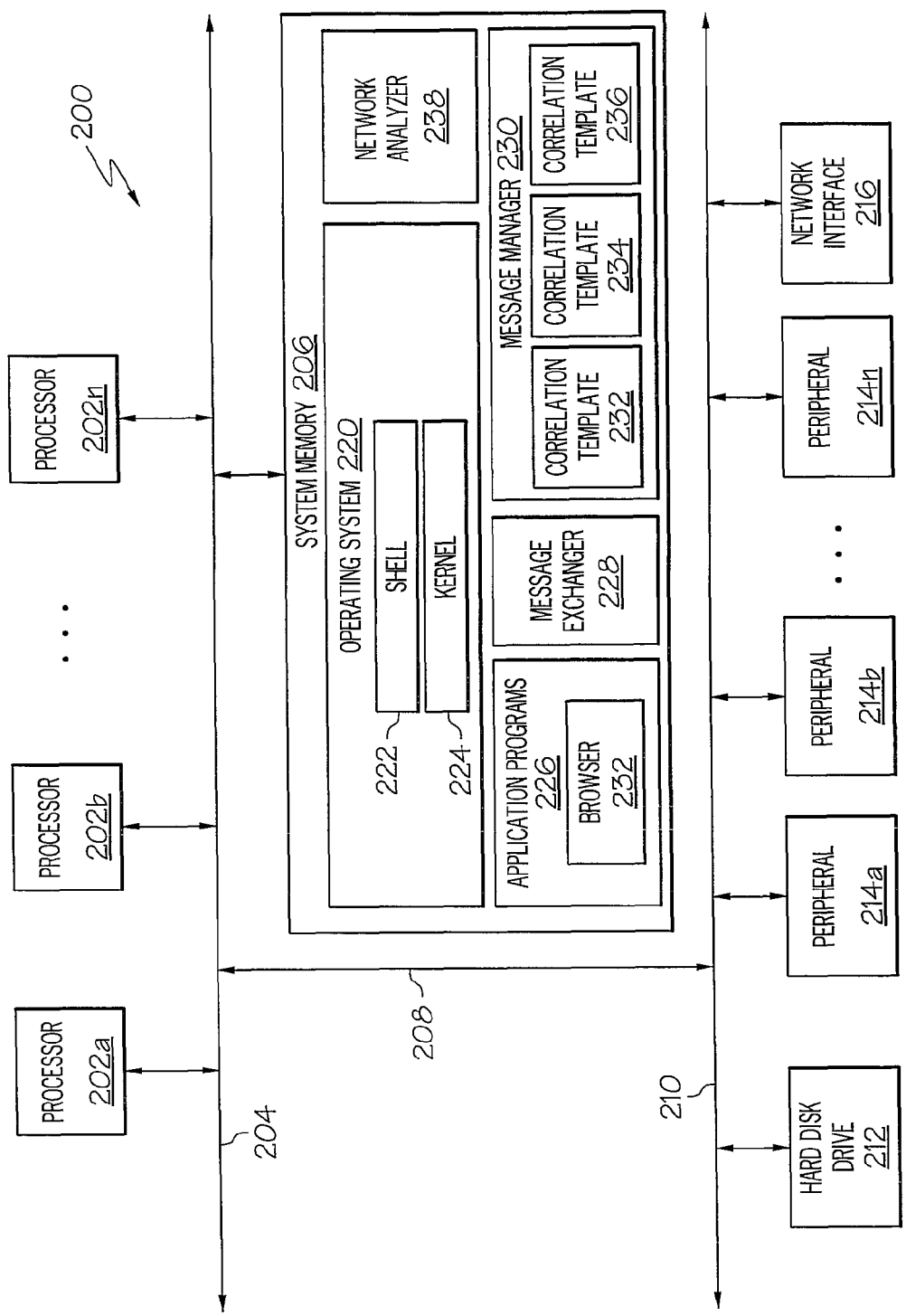
FIG. 2 is a block diagram depicting an exemplary data processing system according to an embodiment of the present invention.

FIG. 2 is a block diagram depicting an exemplary data processing system 200, which may be utilized to implement clients 52a-52n and server 54 as shown in FIG. 1. As illustrated, exemplary data processing system 200 includes a collection of processors 202a-202n that are coupled to a system memory 206 via a system bus 204. System memory 206 may be implemented by dynamic random access memory (DRAM) modules or any other type of random access memory (RAM) module. Mezzanine bus 208 couples system bus 204 to peripheral bus 210. Coupled to peripheral bus 210 is a hard disk drive 212 for mass storage and a collection of peripherals 214a-214n, which may include, but are not limited to, optical drives, other hard disk drives, printers, and input devices, and the like. Network interface 216 enables data processing system 200 to communicate on a network, such as, but not limited to Internet 56.

Included in system memory 206 is operating system 220, which further includes a shell 222 (as it is called in the UNIX® operating system, which is a registered trademark of The Open Group in the United States and other countries), for providing transparent user access to resources such as application programs 226. Shell 222, also called a command processor in Microsoft® Windows® operating system, is generally the highest level of the operating system software hierarchy and serves as a command interpreter. Microsoft® and Windows® are trademarks of Microsoft Corporation in the United States, other countries, or both. Shell 222 provides a system prompt, interprets commands entered by keyboard, mouse, or other input media, and sends the interpreted command(s) to the appropriate lower levels of the operating system (e.g., kernel 224) for processing. Note that while shell 222 is a text-based, line-oriented user interface, the present invention will support other user interface modes, such as graphical, voice, gestural, etc. equally well.

As illustrated, operating system 220 also includes kernel 224 which includes lower levels of functionality for operating system 220 and application programs 226, including memory management, process and task management, disk management, and mouse and keyboard management. Application programs 226 can include browser 228, utilized for access to Internet 56 (shown in FIG. 1), word processors, spreadsheets, and other application programs. Also, as depicted, system memory 206 includes message exchanger 228, message manager 230, and network analyzer 238, all discussed herein in more detail in conjunction with FIGS. 3-7.

In an embodiment of the present invention, message exchanger 228 exchanges SOAP messages between a client and server. Message manager 230 also includes correlation template 232, correlation logic 234, and correlation mapping file 236. Network analyzer 238 may be implemented as a diagnostic tool that a user or network administrator may utilize to analyze the traffic on network 50 (shown in FIG. 1). In an embodiment of the present invention, network analyzer 238 may be a SOAP monitoring tool that provides a dump of the XML messages exchanged over the network.

Once network analyzer 238 provides a dump of an XML message exchanged over the network, message manager 230 examines the SOAP header analyze the QoS information. An embodiment of the present invention involves using a pluggable correlation template 232 and correlation logic 234, which applies correlation template 232 to the SOAP message traces in the SOAP header. Utilizing an artifact, such as a correlation-mapping file 236, correlation logic 234 performs the visual correlation on any set of SOAP message traces. Each correlation-mapping file 236 includes a XML formatted set of rules based on the web service specification-specific messages to be correlated. The correlation mapping file rules include (but are not limited to) a unique identifier keyword, a corresponding correlated keyword, and a unique identifier keyword. Each of these keywords may be mandatory or optional. Correlation logic 234 utilizes the mapping file to process the SOAP message trace to visually identify the correlated messages. Visual queues for correlated pairs would differ from keywords that are missing a correlated message. Also, optional correlated messages would be visually differentiated from mandatory messages.

FIG. 3 depicts an exemplary markup language sample 300 according to an embodiment of the present invention. As illustrated, markup language sample 300 includes a collection of paired protocol elements. Elements 302a-302b are envelope labels that mark the beginning and end of the markup language segment. Elements 304a-304b are header labels that indicate the beginning and end of the header section. As previously discussed, SOAP headers include QoS elements, represented by header data 308, which are examined and accentuated according to an embodiment of the present invention. Elements 306a-306b are body labels that represent the beginning and end of the message body (e.g., message data 310).

Figure 4:
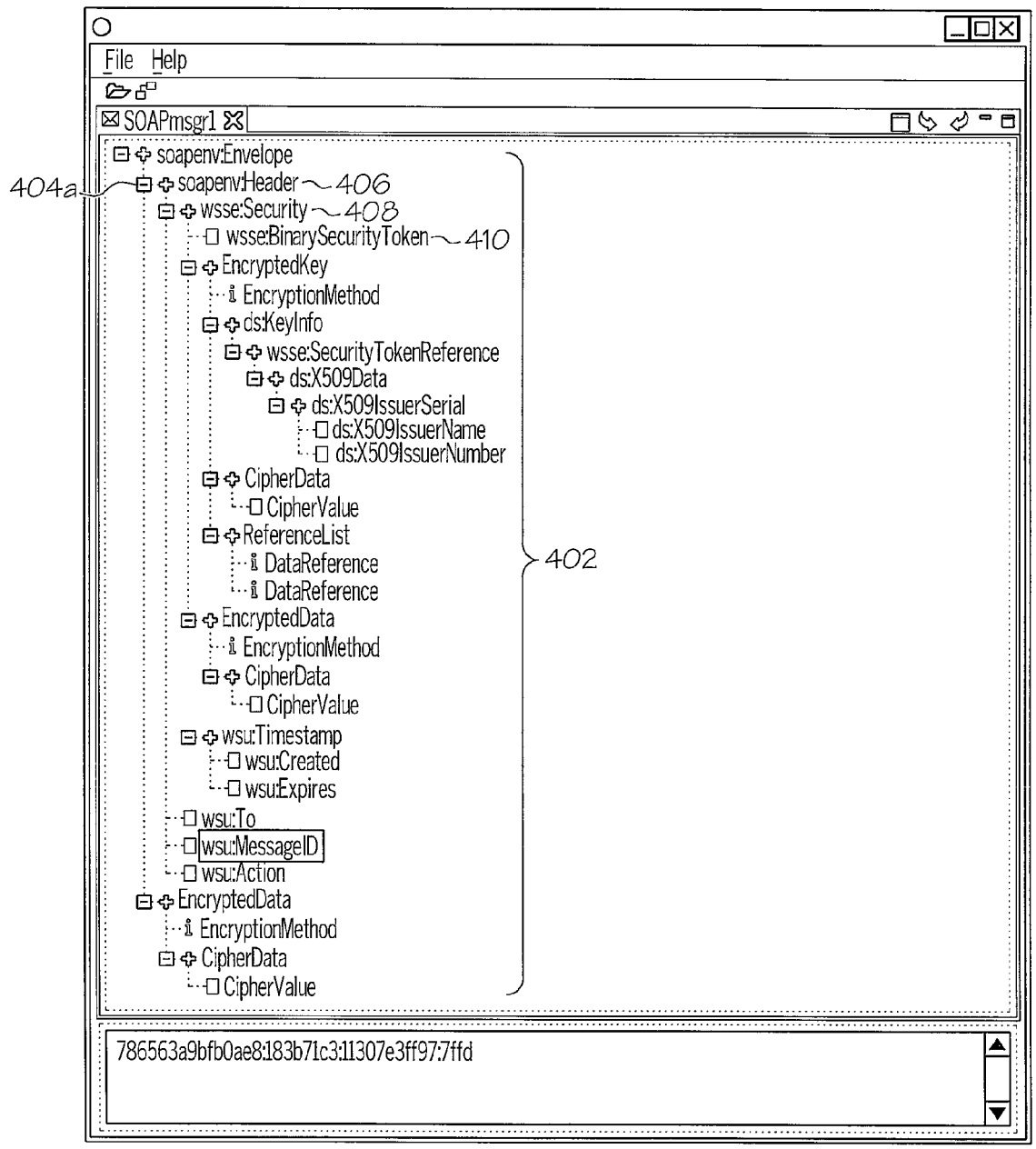
FIG. 4 is a pictorial representation depicting a first exemplary tree structure according to an embodiment of the present invention.

FIG. 4 illustrates a tree structure 402 generated by message manager 230 in accordance with an embodiment of the present invention. According to an embodiment of the present invention, once message manager 230 parses the QoS elements in a SOAP header, the information is graphically accentuated via presentation as a tree structure 402. As illustrated, each identified protocol element is presented as a nested element in the tree structure 402. For example, expansion box 404 enables a user to expand header segment 406 to view any nested elements such as security segment 408. Any data that is included in the individual segments is graphically represented as an icon, such as binary security token 410. The icon may be expanded to display the actual data in a dialogue box.

Figure 5:
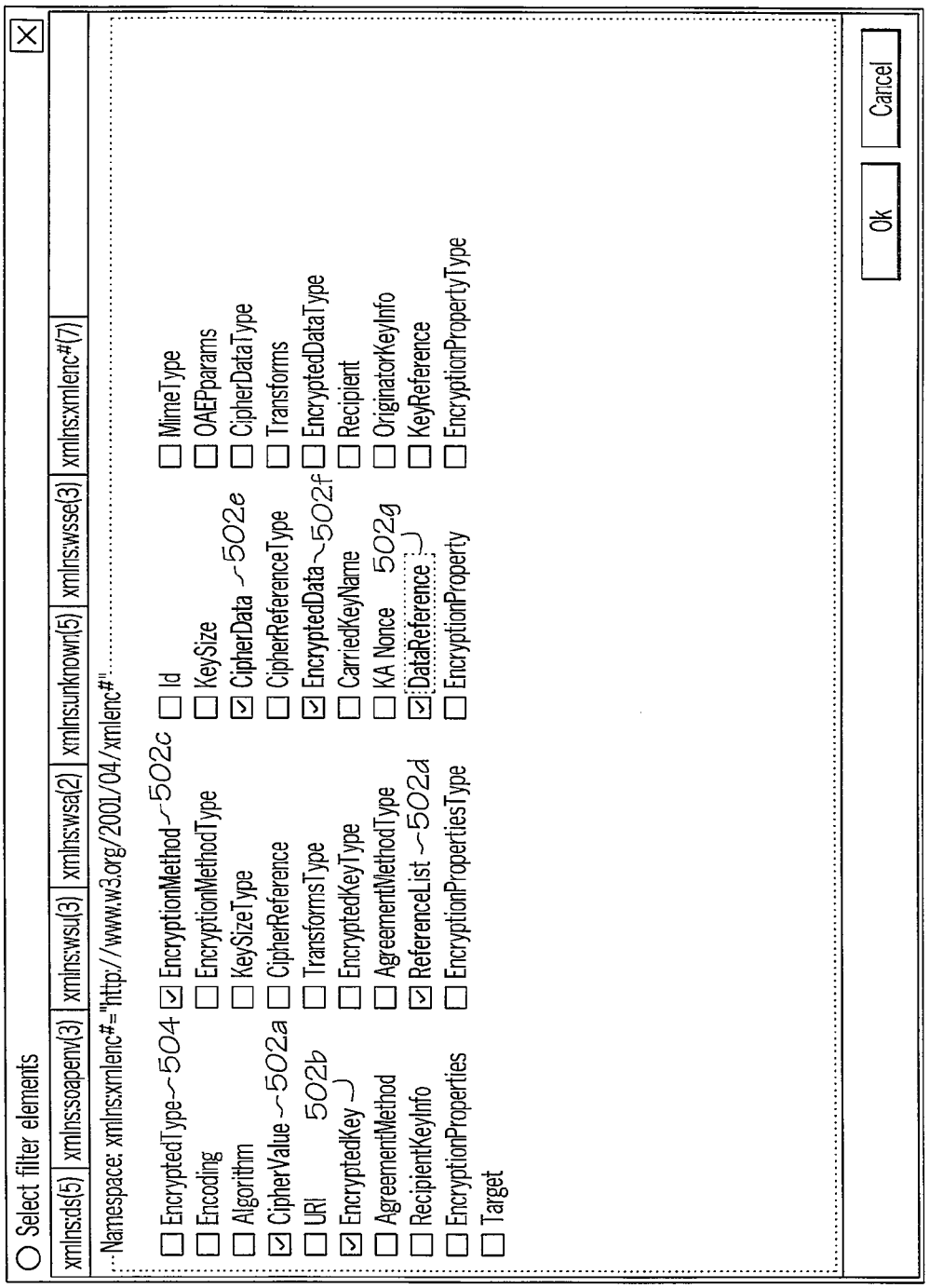
FIG. 5 is a pictorial representation illustrating an exemplary filtering tab menu according to an embodiment of the present invention.

FIG. 5 depicts a filtering tab menu generated by message manager 230 (shown in FIG. 2) in accordance with an embodiment of the present invention. Selection boxes 502a-502g represented selected (either by a user, administrator, or default) QoS protocol elements that will be expanded when displayed in tree structure 602 in FIG. 6. Selection box 504 represents an unselected QoS protocol element that will not be expanded in the tree structure display.

Figure 6:
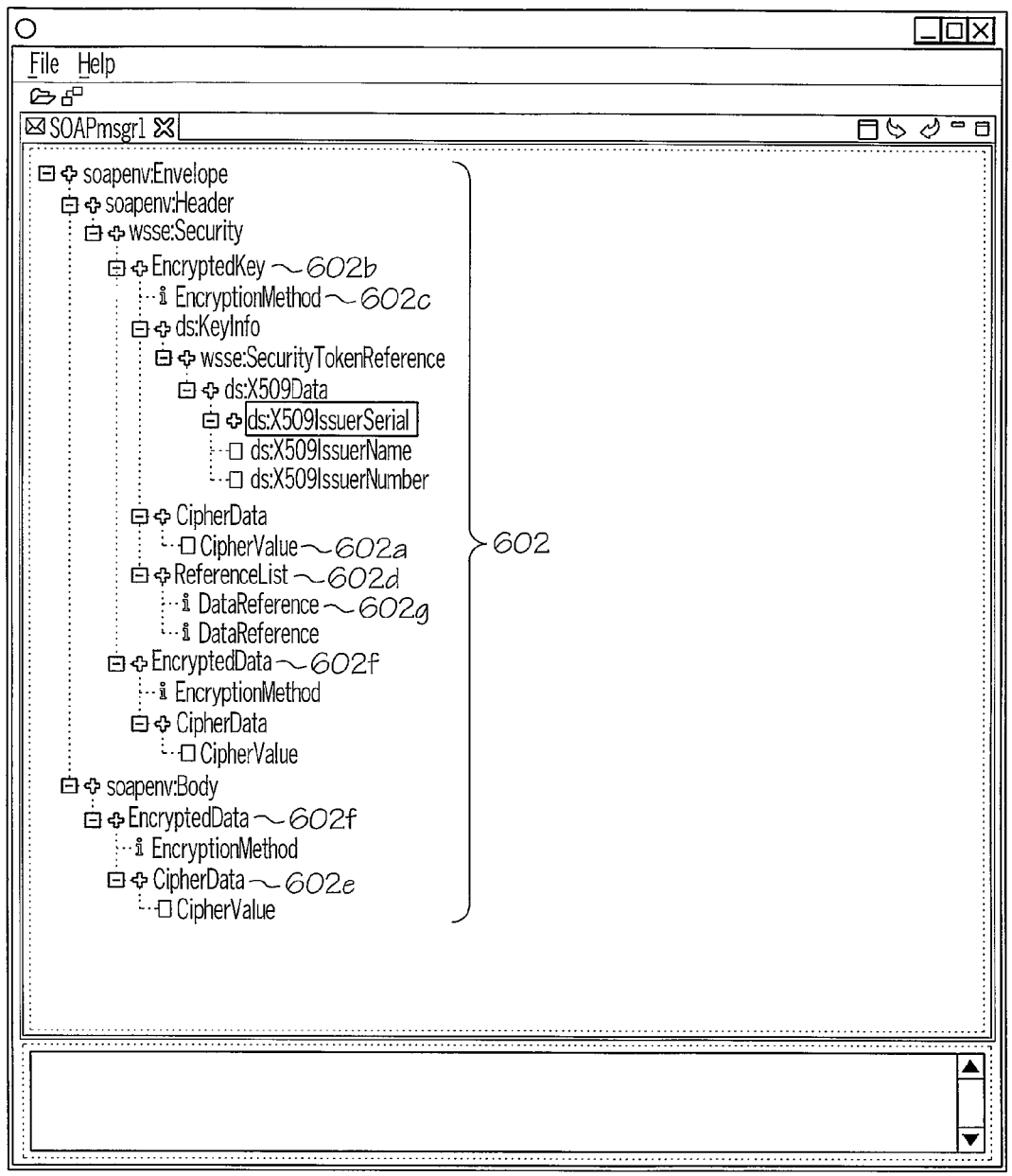
FIG. 6 is a pictorial representation depicting a second exemplary tree structure according to an embodiment of the present invention.

FIG. 6 illustrates a tree structure generated by message manager 230 in accordance with an embodiment of the present invention. As discussed in conjunction with FIG. 5, the QoS protocol elements that were selected by selection boxes 502a-502g (shown in FIG. 5) are displayed in tree structure 602 as segments 602a-602g.

Figure 7:
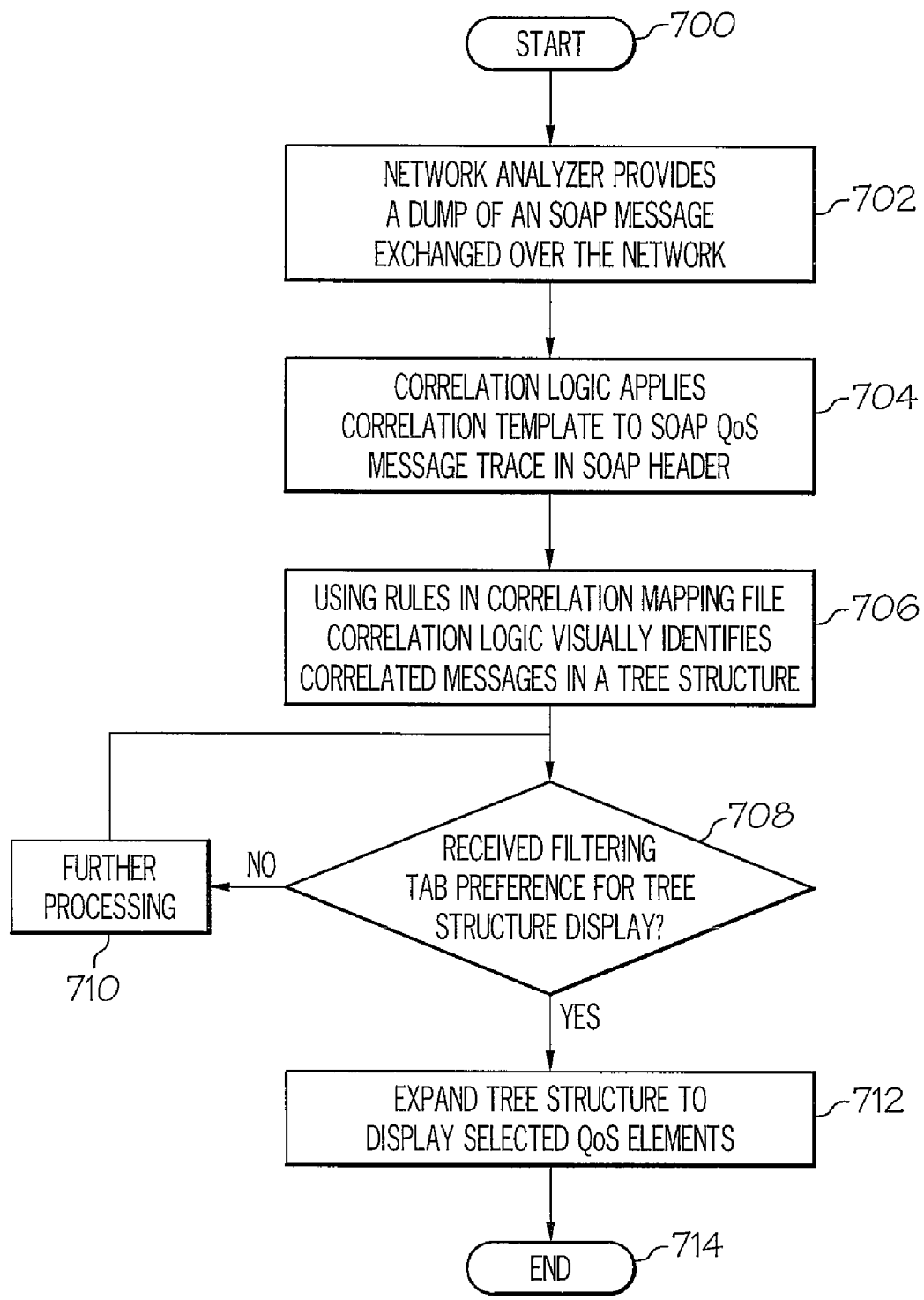
FIG. 7 is a high-level logical flowchart illustrating an exemplary method for implementing correlation-based visualization of Simple Object Access Protocol (SOAP) messages according to an embodiment of the present invention.

FIG. 7 is a high-level logical flowchart illustrating an exemplary method for implementing correlation-based visualization of SOAP messages according to an embodiment of the present invention. The process begins at step 700 and proceeds to step 702, which illustrates network analyzer 238 (shown in FIG. 2), implemented as a SOAP monitoring tool, which provides a dump of a SOAP message exchanged over network 50 (shown in FIG. 1).

Once network analyzer 238 provides a dump of a SOAP message over the network, message manager 230 (shown in FIG. 2) examines the SOAP header analyze the QoS information. As illustrated in step 704, correlation logic 234 (shown in FIG. 2) applies correlation template 232 (shown in FIG. 2) to the SOAP message traces in the SOAP header. As depicted in step 706, correlation logic 234 (shown in FIG. 2) performs the visual correlation on any set of SOAP message traces utilizing correlation mapping file 236 (shown in FIG. 2). In an embodiment of the present invention, the visual correlation performed may include organizing and presenting the QoS elements in a tree structure (FIGS. 4 and 6).

Each correlation-mapping file 236 includes a XML formatted set of rules based on the web service specification-specific messages to be correlated. The correlation mapping file rules include (but are not limited to) a unique identifier keyword, a corresponding correlated keyword, and a unique identifier keyword. Each of these keywords may be mandatory or optional. Correlation logic 234 (shown in FIG. 2) utilizes the mapping file to process the SOAP message trace to visually identify the correlated messages. Visual queues for correlated pairs would differ from keywords that are missing a correlated message. Also, optional correlated messages would be visually differentiated from mandatory messages.

The process continues to step 708, which illustrates message manager 230 (shown in FIG. 2) determining if filtering tab preferences (e.g., FIG. 5) have been received. The filtering tab preferences may be set by a user, administrator, or default. If the filtering tab preferences have not been received, the process continues to step 710, which depicts message manager 230 (shown in FIG. 2) performing other processing. The process returns to step 708.

If the filtering tab preferences have been received, the process continues to step 712, which illustrates message manager 230 (shown in FIG. 2) expanding the tree structure to display selected QoS elements. The process ends, as depicted in step 714.

As discussed, the present invention includes a system and method for implementing correlation-based visualization of markup language messages. According to an embodiment of the present invention, a message manager receives a markup language message exchanged over a network. Correlation logic applies a template to the markup language message. Correlation logic utilizes at least one rule to visually identify correlated message in the markup language message in a tree structure. The message manager outputs the tree structure.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should be noted that, in some alternative implementations, the functions noted in the block may occur out of the order noted in the figures. For example, two blocks shown in succession may, in fact, be executed substantially concurrently, or the blocks may sometimes be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for the purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in appended claims.

What is claimed is:

1. A computer-implementable method for implementing correlation-based visualization of a markup language messages, said computer-implementable method comprising:
   receiving an inbound markup language message over a network in response to an outbound markup language message sent over the network;
   applying a template to at least said inbound markup language message;
   utilizing at least one rule to visually identify correlated elements in said inbound markup language message and said outbound markup language message in a tree structure; and
   outputting said tree structure.

2. The computer-implementable method according to claim 1, further comprising:
   receiving at least one filtering preference for displaying said tree structure.

3. The computer-implementable method according to claim 2, wherein said outputting further comprises:
   outputting said tree structure wherein quality of service (QoS) elements specified by said at least one filtering preference are expanded during display of said tree structure.

4. The computer-implementable method according to claim 1, wherein said inbound and outbound markup language messages are SOAP messages.

5. The computer-implementable method according to claim 1, wherein said template further comprises an extensible markup language (XML) formatted set of rules based on a web-service specification implemented by said inbound and outbound markup language messages.

6. The computer-implementable method according to claim 5, wherein said formatted set of rules further comprises a unique identifier keyword and a corresponding correlated keyword.

7. A system for implementing correlation-based visualization of a markup language messages, said system comprising:
   at least one processor;
   an interconnect coupled to said at least one processor;
   a computer-readable storage medium, coupled to said at least one processor via said interconnect, said computer-readable storage medium further including computer-executable instructions executable by said at least one processor and configured for:
     receiving an inbound markup language message exchanged over a network in response to an outbound markup language message sent over the network;
     applying a template to at least said inbound markup language message;
     utilizing at least one rule to visually identify correlated elements in said inbound markup language message and said outbound markup language message in a tree structure; and
     outputting said tree structure.

8. The system according to claim 7, wherein said instructions are further configured for:
   receiving at least one filtering preference for displaying said tree structure.

9. The system according to claim 8, wherein said instructions are further configured for:
   outputting said tree structure wherein quality of service (QoS) elements specified by said at least one filtering preference are expanded during display of said tree structure.

10. The system according to claim 7, wherein said inbound and outbound markup language messages are SOAP messages.

11. The system according to claim 7, wherein said template further comprises an extensible markup language (XML) formatted set of rules based on a web-service specification implemented by said inbound and outbound markup language messages.

12. The system according to claim 11, wherein said formatted set of rules further comprises a unique identifier keyword and a corresponding correlated keyword.

13. A computer program product for implementing correlation-based visualization of a markup language messages in a computer system, said computer program product comprising:
   a computer readable storage medium having computer usable program code embodied therewith, the computer usable program code comprising:
   computer usable program code configured to receive an inbound markup language message over a network in response to an outbound markup language message sent over the network;
   computer usable program code configured to apply a template to at least said inbound markup language message;
   computer usable program code configured to utilize at least one rule to visually identify correlated elements in said inbound markup language message and said outbound markup language message in a tree structure; and
   computer usable program code configured to output said tree structure.

14. The computer program product according to claim 13, wherein said computer usable program code further comprises:
   computer usable program code configured to receive at least one filtering preference for displaying said tree structure.

15. The computer program product according to claim 14, wherein said computer usable program code further comprises:
   computer usable program code configured to output said tree structure wherein of service (QoS) elements specified by said at least one filtering preference are expanded during display of said tree structure.

16. The computer program product according to claim 13, wherein said inbound and outbound markup language messages are SOAP messages.

17. The computer program product according to claim 13, wherein said template further comprises an extensible markup language (XML) formatted set of rules based on a web-service specification implemented by said inbound and outbound markup language messages.

18. The computer program product according to claim 17, wherein said formatted set of rules further comprises a unique identifier keyword and a corresponding correlated keyword.

* * * * *